United States Patent
Lee et al.

(10) Patent No.: US 10,178,584 B2
(45) Date of Patent: Jan. 8, 2019

(54) METHOD FOR CHANGING A LINK CONNECTION IN A COMMUNICATION SYSTEM AND DEVICE THEREFOR

(71) Applicant: LG ELECTRONICS INC., Seoul (KR)

(72) Inventors: Jaewook Lee, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/569,582

(22) PCT Filed: May 13, 2016

(86) PCT No.: PCT/KR2016/005062
§ 371 (c)(1),
(2) Date: Oct. 26, 2017

(87) PCT Pub. No.: WO2016/186387
PCT Pub. Date: Nov. 24, 2016

(65) Prior Publication Data
US 2018/0098249 A1    Apr. 5, 2018

Related U.S. Application Data

(60) Provisional application No. 62/204,453, filed on Aug. 13, 2015, provisional application No. 62/165,215, (Continued)

(51) Int. Cl.
*H04L 1/00* (2006.01)
*H04W 36/00* (2009.01)
(Continued)

(52) U.S. Cl.
CPC ........ *H04W 36/0011* (2013.01); *H04W 36/30* (2013.01); *H04W 76/23* (2018.02)

(58) Field of Classification Search
CPC . H04W 36/0011; H04W 36/30; H04W 40/10; H04W 52/0206; H04W 28/08;
(Continued)

(56) References Cited

U.S. PATENT DOCUMENTS

| | | |
|---|---|---|
| 2014/0023008 A1 | 1/2014 | Ahn et al. |
| 2014/0066119 A1 | 3/2014 | Tavildar et al. |
| 2018/0098370 A1* | 4/2018 | Bangolae .............. H04W 76/14 |

FOREIGN PATENT DOCUMENTS

WO    WO 2014/069064 A1    5/2014

OTHER PUBLICATIONS

Ericsson, "ProSe UE to network Relay & Service continuity solution," SA WG2 Meeting #108, S2-150787, San Jose Del Cabo, Mexico, Apr. 13-17, 2015, pp. 1-10.
(Continued)

*Primary Examiner* — Phuoc H Doan
(74) *Attorney, Agent, or Firm* — Birch, Stewart, Kolasch & Birch, LLP

(57) ABSTRACT

The present invention relates to a wireless communication system. More specifically, the present invention relates to a method and a device for changing a connection by a user equipment (UE) connected with a relay UE through a device to device (D2D) link in a wireless communication system, the method comprising: receiving information on a threshold value through a broadcast signaling; measuring a quality of a channel from a cell; establishing a radio resource control (RRC) connection with the cell when the measured quality is higher than the threshold value; and releasing the D2D link with the relay.

14 Claims, 10 Drawing Sheets

Related U.S. Application Data filed on May 22, 2015, provisional application No. 62/162,614, filed on May 15, 2015.

(51) Int. Cl.
*H04W 76/23* (2018.01)
*H04W 36/30* (2009.01)

(58) Field of Classification Search
CPC . H04W 74/0808; H04W 88/04; H04W 72/02; H04B 7/0697
USPC .......................... 370/315; 455/437, 11.1, 10
See application file for complete search history.

(56) References Cited

OTHER PUBLICATIONS

Sony, "UE-to-Network Relay Measurements and Selection/Reselection," 3GPP TSG RAN WG2 Meeting #89bis, R2-151080, Bratislava, Slovakia, Apr. 20-24, 2015, 3 pages.

\* cited by examiner

[Fig. 1]
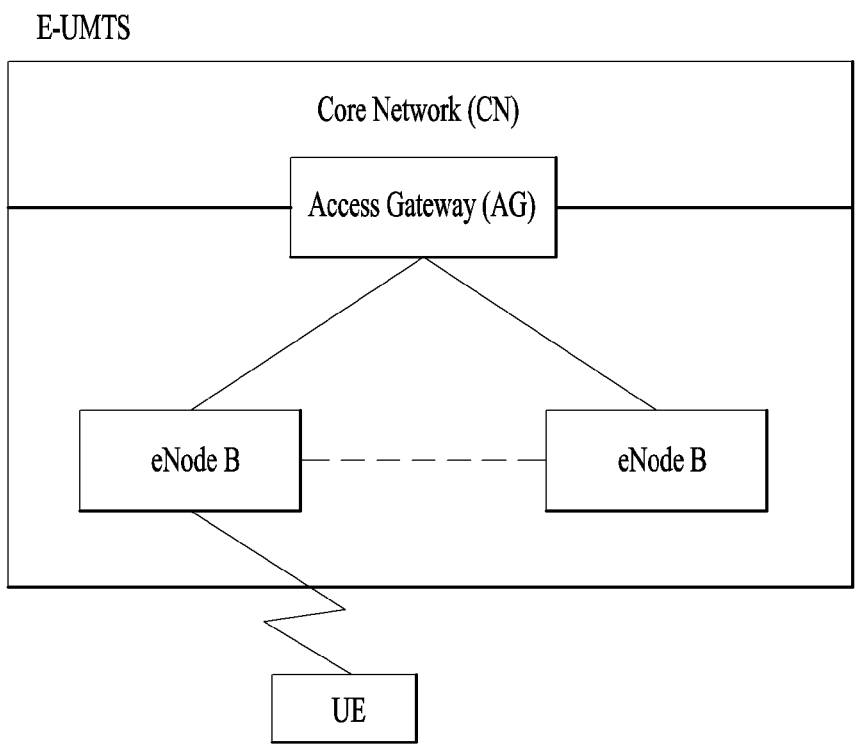

[Fig. 2A]
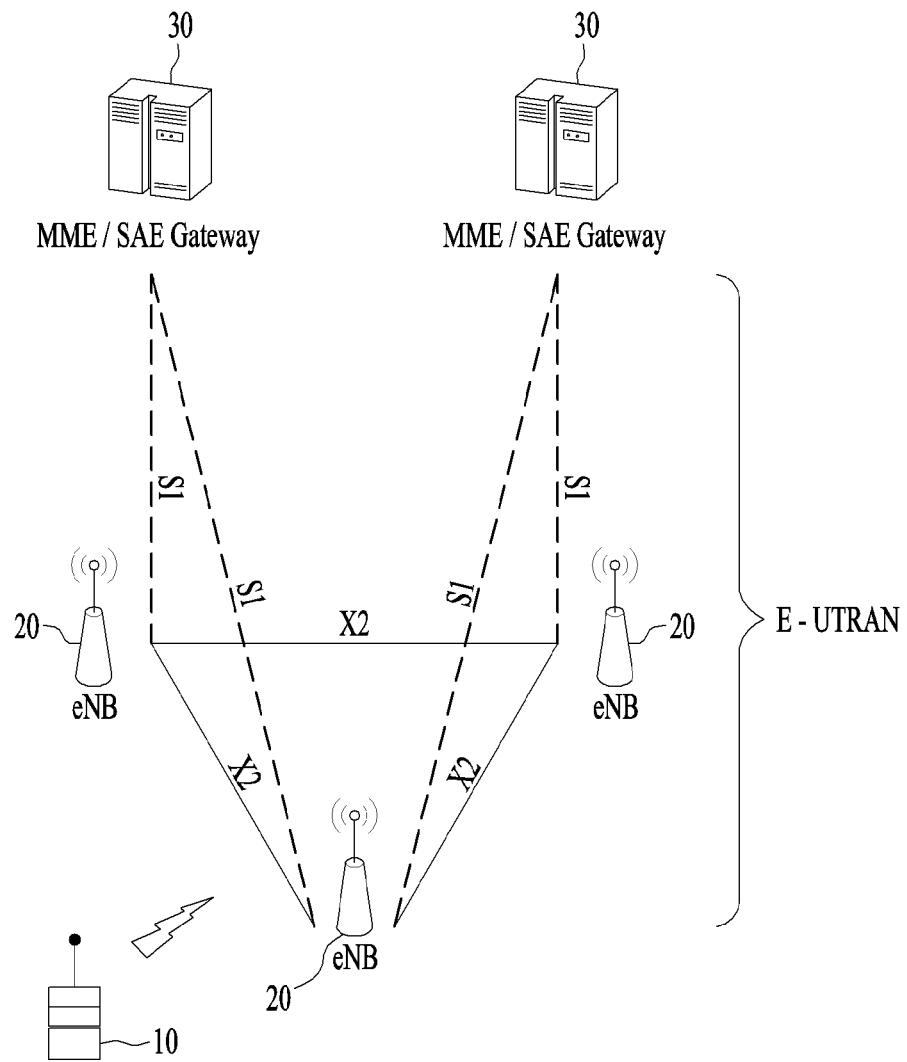

[Fig. 2B]
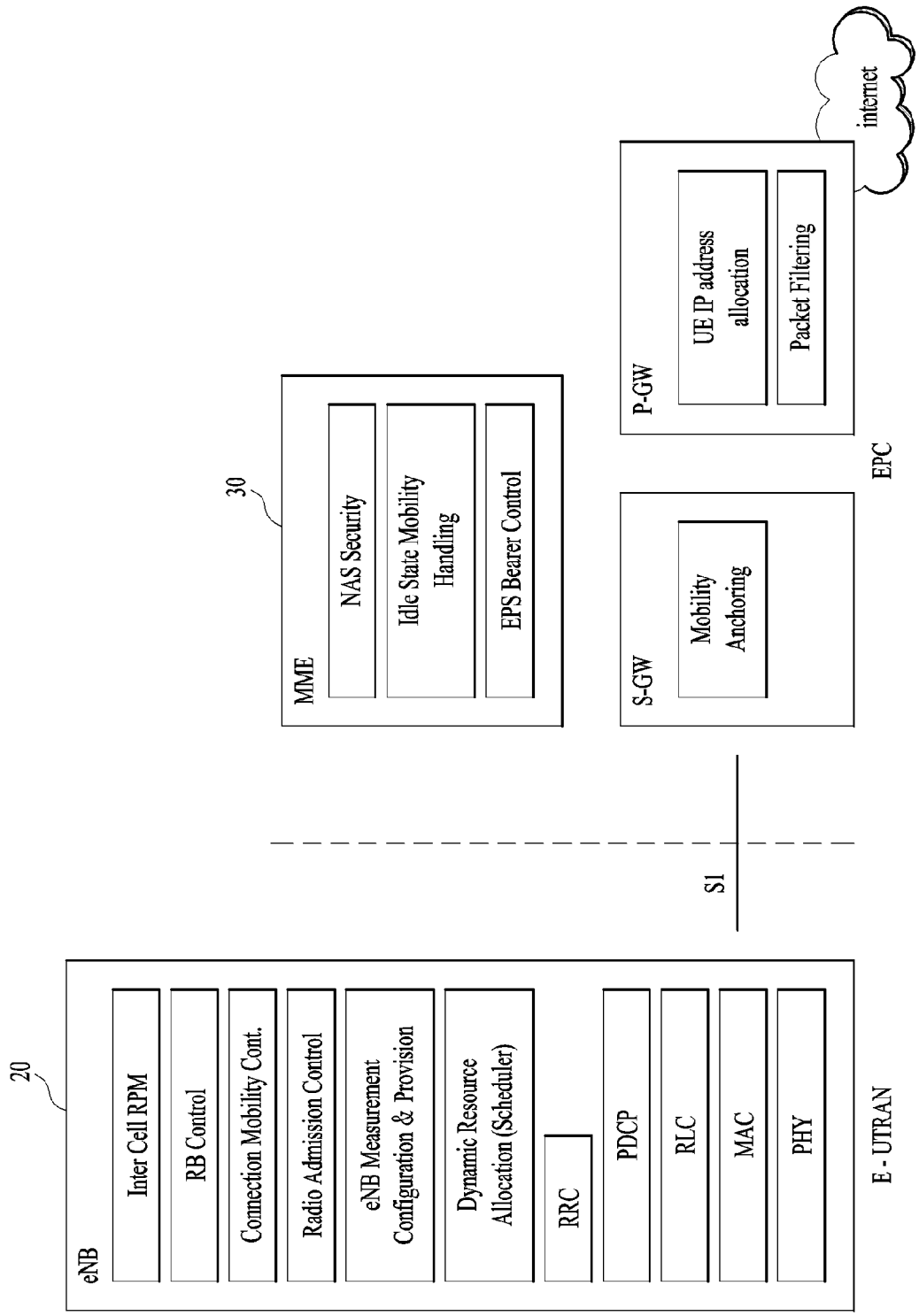

[Fig. 3]
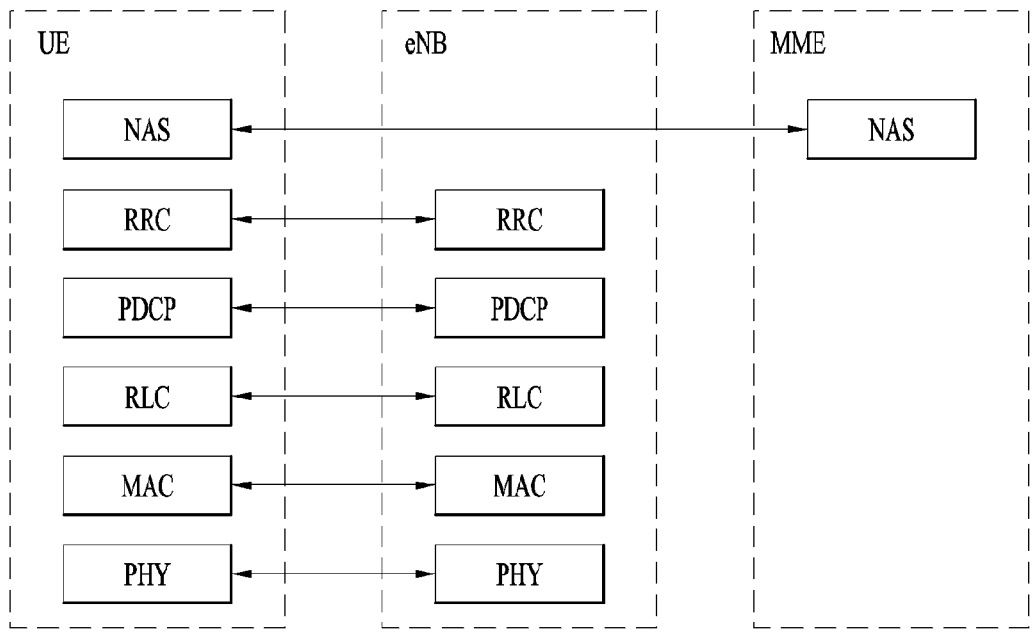
(a) Control-Plane Protocol Stack
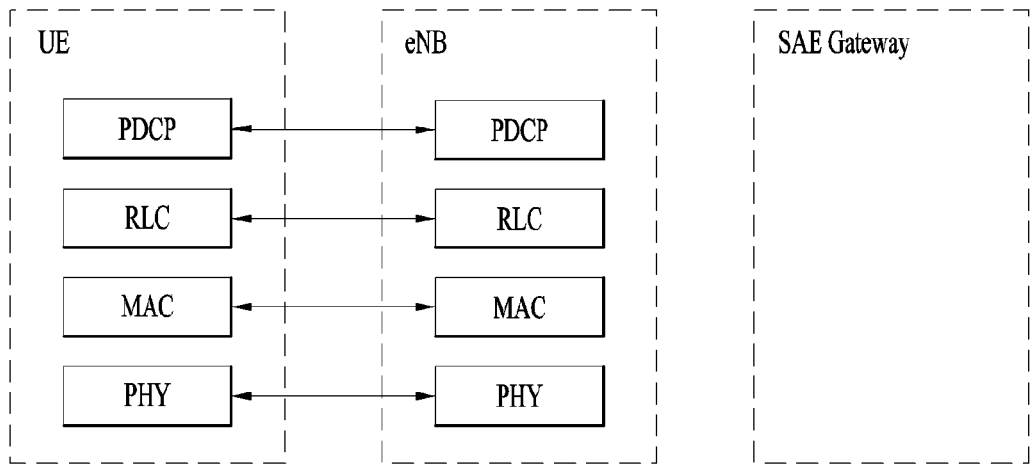
(b) User-Plane Protocol Stack

[Fig. 4]
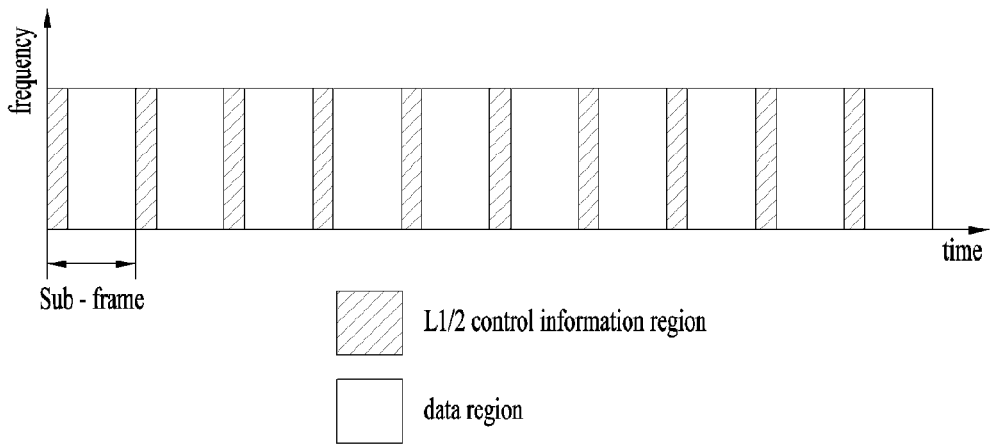
[Fig. 5]
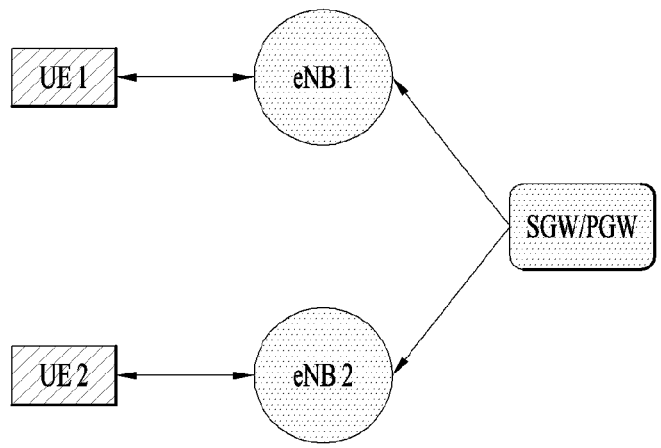
[Fig. 6]
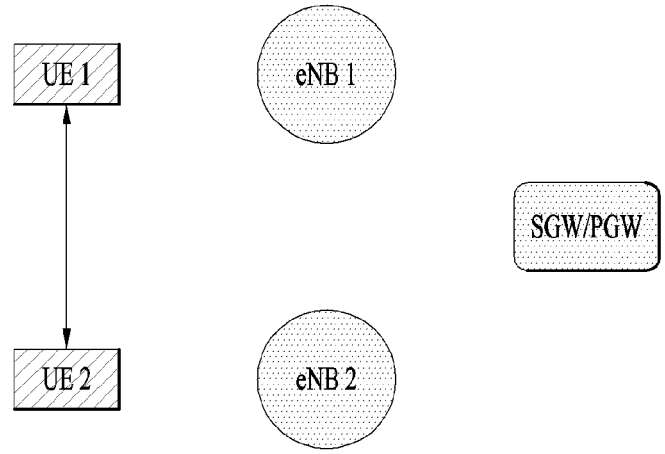

[Fig. 7]
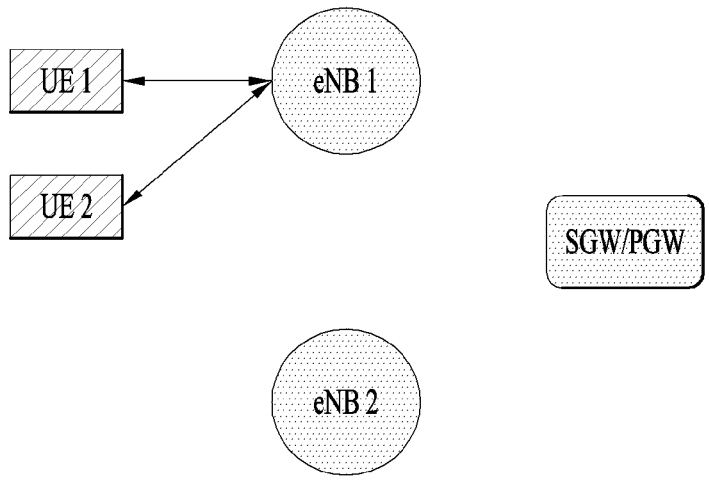
[Fig. 8]
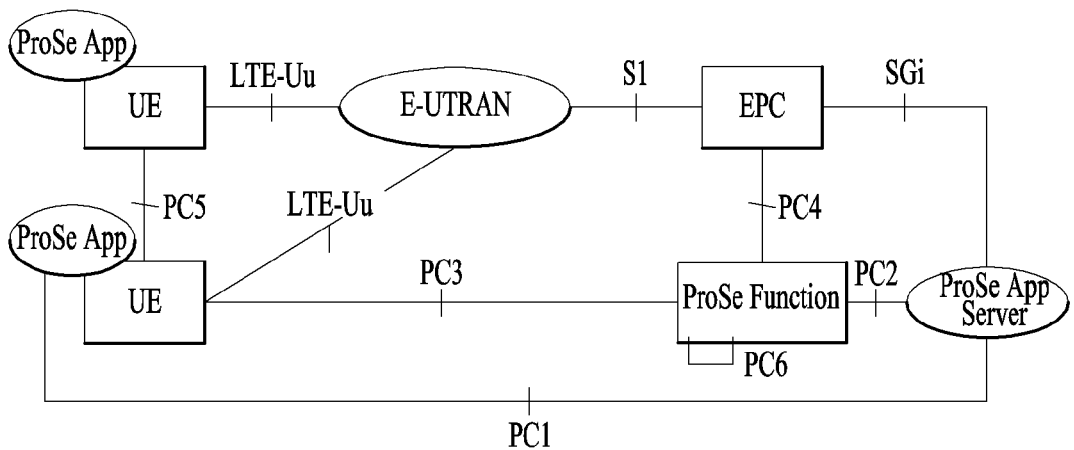

[Fig. 9]
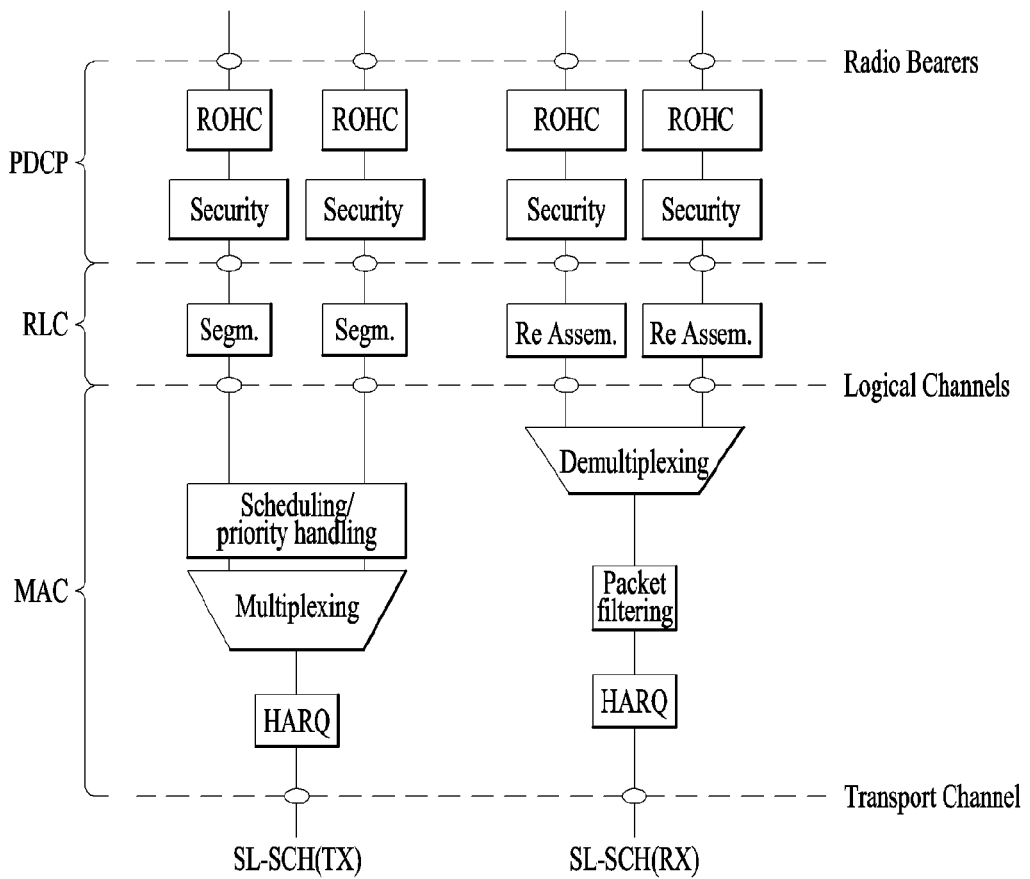

[Fig. 10]
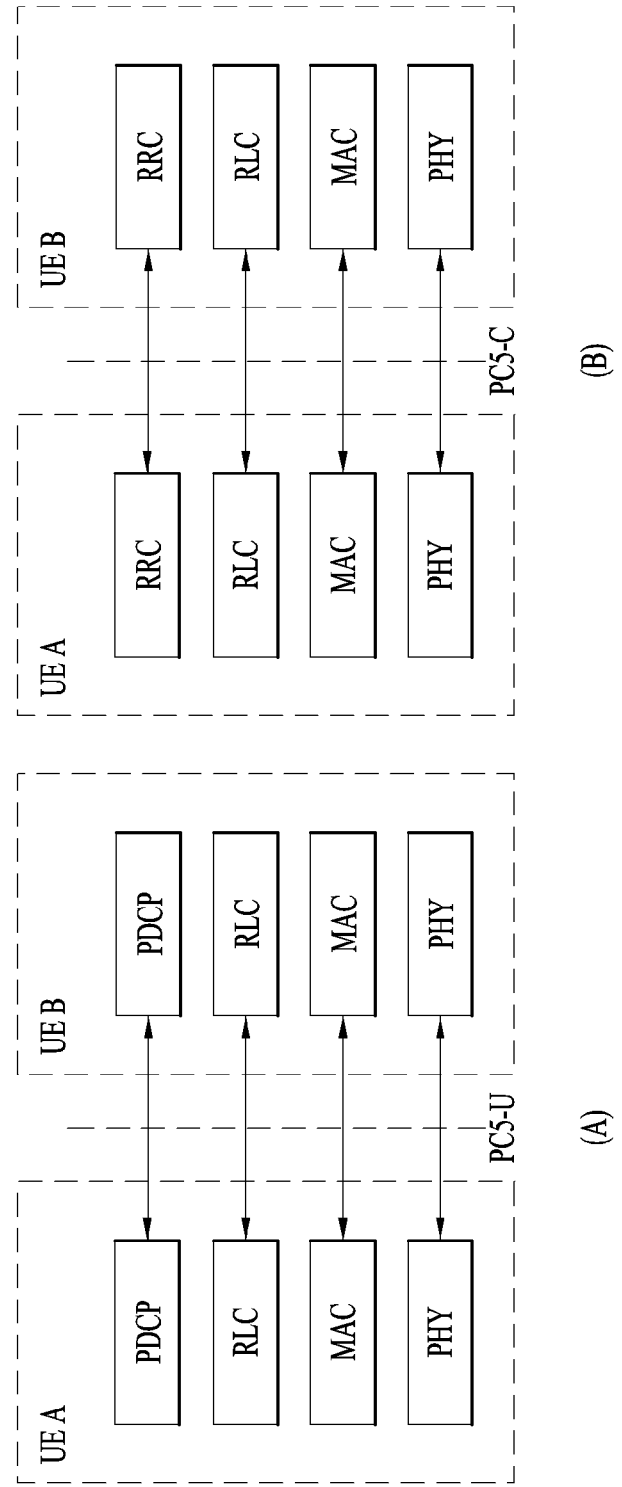

[Fig. 11]
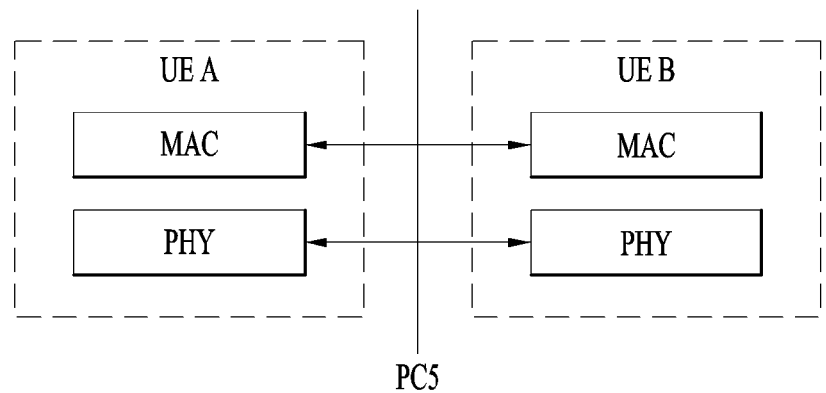
[Fig. 12]
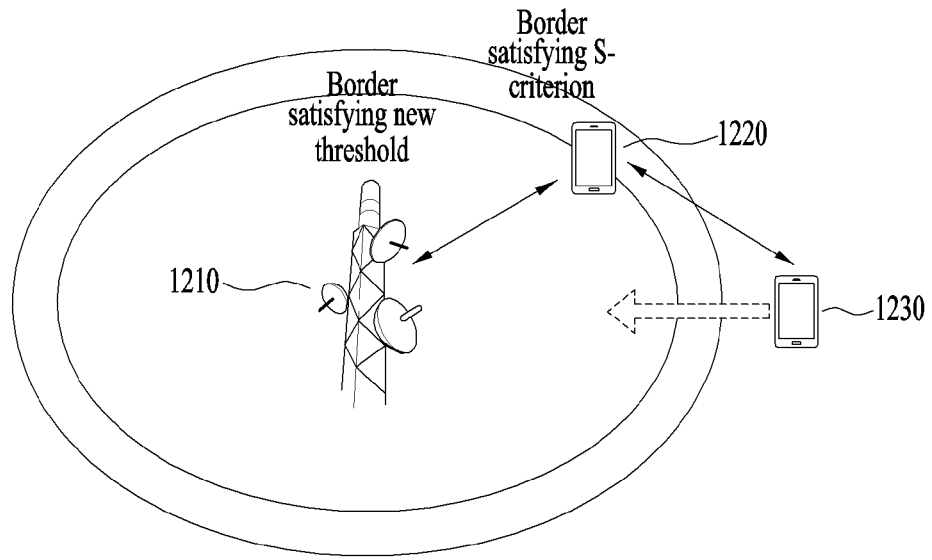

[Fig. 13]
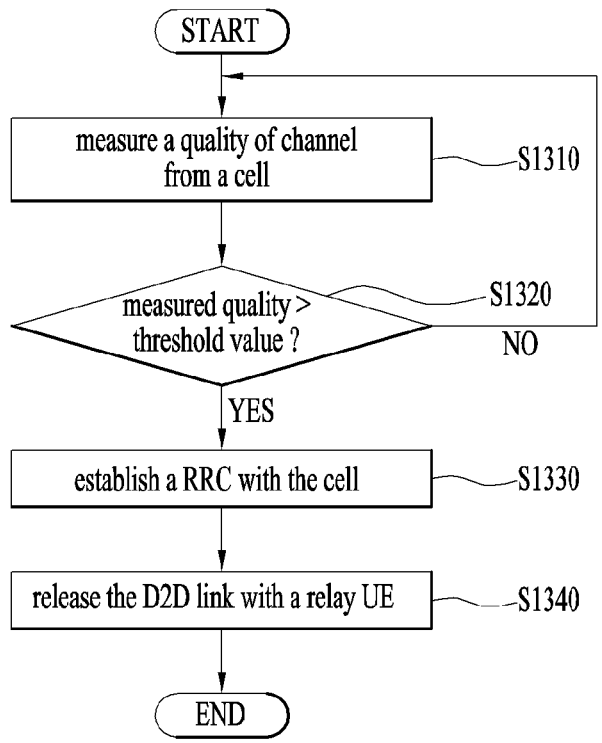
[Fig. 14]
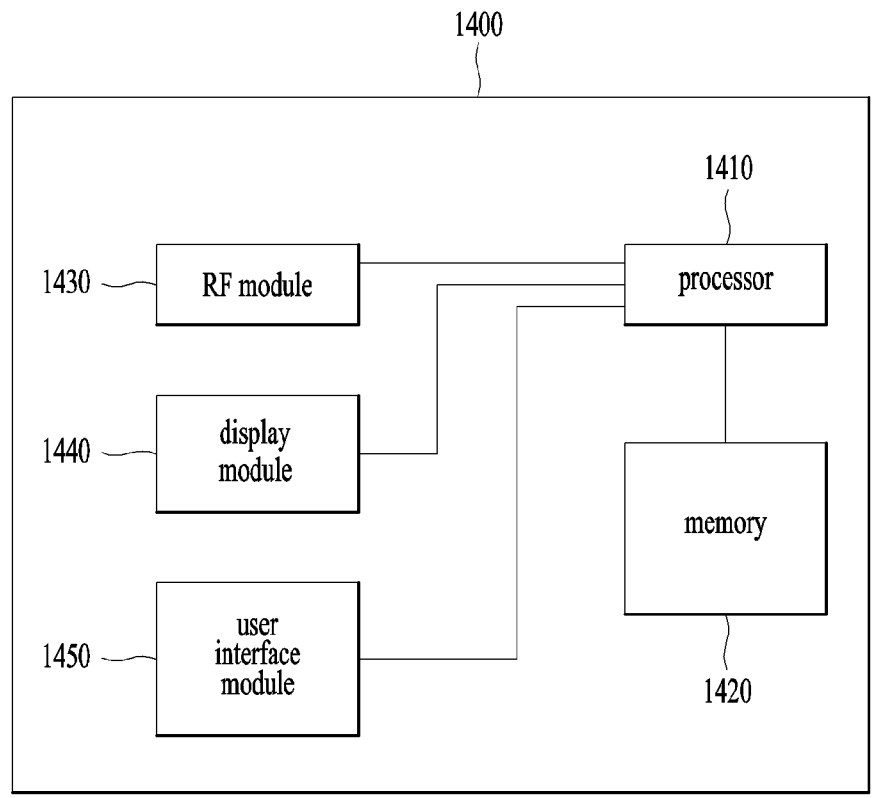

METHOD FOR CHANGING A LINK CONNECTION IN A COMMUNICATION SYSTEM AND DEVICE THEREFOR

CROSS REFERENCE TO RELATED APPLICATIONS

This application is the National Phase of PCT International Application No. PCT/KR2016/005062, filed on May 13, 2016, which claims priority under 35 U.S.C. 119(e) to U.S. Provisional Application No. 62/162,614, filed on May 15, 2015, No. 62/165,215, filed on May 22, 2015, and No. 62/204,453, filed on Aug. 13, 2015, all of which are hereby expressly incorporated by reference into the present application.

TECHNICAL FIELD

The present invention relates to a wireless communication system and, more particularly, to a method for changing a link connection by a user equipment (UE) in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

DISCLOSURE OF INVENTION

Technical Problem

Based on the above-mentioned discussion, methods for changing a link connection and apparatuses therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

Solution to Problem

The object of the present invention can be achieved by providing a method for changing a connection by a user equipment (UE) connected with a relay UE through a device to device (D2D) link in a wireless communication system, the method comprising: receiving information on a threshold value through a broadcast signaling; measuring a quality of a channel from a cell; establishing a radio resource control (RRC) connection with the cell when the measured quality is higher than the threshold value; and releasing the D2D link with the relay.

In another aspect of the present invention provided herein is an UE connected with a relay UE through a device to device (D2D) link in wireless communication system, the UE comprising: a radio frequency (RF) module configured to transmit/receive signals; and a processor configured to process the signals, wherein the processor is configured to control the RF module to receive information on a threshold value through a broadcast signaling, measure a quality of a channel from a cell, establish a radio resource control (RRC) connection with the cell when the measured quality is higher than the threshold value, and release the D2D link with the relay.

Preferably, if data is being received through the D2D link, the D2D link is released after the data reception is completed.

Preferably, the D2D link is released when the RRC connection establishment is completed.

Preferably, the information on the threshold value comprises validity information, wherein the validity information includes at least one of time information indicating a time condition in which the threshold value is applied effectively and area information indicating an area condition in which the threshold value is applied effectively.

Preferably, the method wherein the releasing the D2D link comprises: transmitting assistance information on the relay UE to the cell; receiving a message for releasing the D2D link from the cell in response to the assistance information; and releasing the D2D link connection based on the message.

Preferably, the method wherein the releasing the D2D link comprises further comprises: transmitting a D2D link release message to the connected relay UE; and receiving a response message in response to the D2D link release message.

Preferably, the cell of the UE satisfies suitability condition.

Advantageous Effects of Invention

According to the present invention, a sidelink buffer status report can be canceled in a D2D communication system under a certain condition.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a diagram of an example physical channel structure used in an E-UMTS system;

FIG. 5 is an example of default data path for a normal communication;

FIGS. 6 and 7 are examples of data path scenarios for a proximity communication;

FIG. 8 is a conceptual diagram illustrating for a non-roaming reference architecture;

FIG. 9 is a conceptual diagram illustrating for a Layer 2 Structure for Sidelink;

FIG. 10a is a conceptual diagram illustrating for User-Plane protocol stack for ProSe Direct Communication, and FIG. 10b is Control-Plane protocol stack for ProSe Direct Communication;

FIG. 11 is a conceptual diagram illustrating for a PC5 interface for ProSe Direct Discovery;

FIG. 12 is a conceptual diagram illustrating for one example of a wireless Communication system supporting ProSe Direct Communication according to one embodiment of the present invention.

FIG. 13 shows an example of a method for changing a link connection according to an embodiment of the present invention.

FIG. 14 is a block diagram for one example of a communication device according to one embodiment of the present invention.

MODE FOR THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is an example of default data path for communication between two UEs. With reference to FIG. 5, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 6 and 7 are examples of data path scenarios for a proximity communication. If wireless devices (e.g., UE1, UE2) are in proximity of each other, they may be able to use a direct mode data path (FIG. 6) or a locally routed data path (FIG. 7). In the direct mode data path, wireless devices are connected directly each other (after appropriate procedure(s), such as authentication), without eNB and SGW/PGW. In the locally routed data path, wireless devices are connected each other through eNB only.

FIG. 8 is a conceptual diagram illustrating for a non-roaming reference architecture.

PC1 to PC5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 8.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging)

Especially, the following identities are used for ProSe Direct Communication:
Source Layer-2 ID identifies a sender of a D2D packet at PC5 interface. The Source Layer-2 ID is used for identification of the receiver RLC UM entity;
Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

FIG. 9 is a conceptual diagram illustrating for a Layer 2 structure for Sidelink. The Sidelink is UE to UE interface for ProSe direct communication and ProSe Direct Discovery. Correspond to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

FIG. 10a is a conceptual diagram illustrating for User-Plane protocol stack for ProSe Direct Communication, and FIG. 10b is Control-Plane protocol stack for ProSe Direct Communication.

FIG. 10a shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 10a.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 10b shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

FIG. 11 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 11.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signaled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Recently, the extension of network coverage using L3-based UE-to-Network Relay is expected to be supported. When the UE starts ProSe communication within the network and then moves out of the coverage, the relay may be selected by the UE or the network for service coverage extension. During changing the traffic path of the (potential) remote UE from eNB to a relay, there could be service interruption if the relaying service activation (including relay selection) for the remote UE is performed too late. On the contrary, if the relaying service activation is performed early, the remote UE might have dual connectivity for the same (or different) PDN connection(s) where one connectivity goes through the eNB and another goes through relay. In addition, the (potential) UE may establish unnecessary connection between relay.

FIG. 12 is a conceptual diagram illustrating for one example of a wireless Communication system supporting ProSe Direct Communication according to one embodiment of the present invention.

Referring FIG. 12, a wireless Communication system supporting ProSe Direct Communication includes eNodeB 1210, relay 1220, and remote UE 1230. According to one embodiment, the remote UE 1230 may be served by the relay 1220 when staying out of coverage is going toward cell border satisfying s-criterion (in-coverage). It is assumed that the remote UE 1230 is currently served by relay 1220 which is within the cell. A threshold for a remote UE 1230 disconnecting the established (one-to-one) connection between the remote UE 1230 and the relay 1220 may be defined as follows.

FIG. 13 shows an example of a method for changing a link connection according to an embodiment of the present invention.

Referring FIG. 13, the remote UE measure a quality of channel from a cell S1310. For example, the remote UE may measure Reference Signal Received Power (RSRP) and/or Reference Signal Received Quality (RSRQ). Subsequently, the remote UE determine whether the measured quality is higher than a threshold value S1320. As a result, if the measured quality is higher than a configured/fixed threshold value, the remote UE may establish a radio resource control (RRC) with the cell S1330 for example due to service request, TAU.

For example, the threshold may be a value bigger than the threshold values for S-criterion. In this case, if a hysteresis value is additionally configured, the configured hysteresis value is used in the above comparison. As an example, if the measured RSRP/RSRQ value−hysteresis>the configured RSRP/RSRQ threshold, the entering condition is triggered and entering procedure is performed by the UE. As another example, if the measured RSRP/RSRQ value+hysteresis<the configured RSRP/RSRQ threshold, leaving condition is triggered and leaving procedure is performed by the UE.

For another example, conditions for establishing a RRC may be as follows: i) if a cell satisfy S-criterion, ii) if the UE's serving cell is suitable, iii) if the UE's serving cell fulfils the conditions to support sidelink direct communication in limited service state as specified in TS 23.303 section 4.5.6 and the UE is in RRC_IDLE, iv) if the serving cell of the relay is different from the serving cell of the remote UE, and v) if the cell of the relay for ProSe/MBMS is different from the cell of the remote UE for ProSe/MBMS.

The threshold is fixed or provided in broadcast signaling or dedicated signaling. If the threshold is provided in dedicated/broadcast signaling, the validity information also is provided. The validity information may include:

i) Time information: When the validity information is received or the UE transits to RRC idle state, the UE sets the timer with the value included in validity information. Alternatively, the UE sets the timer with the value included in validity information upon receiving the information. If the timer is expired, the UE considers the configured threshold invalid. During the timer is running, the UE considers the configured threshold valid.

ii) Area information: Area information includes the list of cell identities, tracking area identities, PLMN IDs. When the UE in the area identified by area information, the UE considers the configured threshold valid.

iii) The time information and area information: In this case, time condition and area condition is met, the UE considers the configured threshold valid. Otherwise, the UE considers the configured threshold invalid.

In addition, if the measured quality is higher than a configured/fixed threshold value, the remote UE may release the D2D link with a relay UE S1340. As an example, conditions for releasing the D2D link may be the same as the conditions for establishing a RRC with the cell described above. As another example, the remote UE may release the D2D link with a relay UE when the RRC establishment is completed. As a release procedure, the remote UE autonomously sends the connection disconnect request message over PC5 to the relay UE. The relay UE responds to the disconnect request message over PC5 to the remote UE. In another words, conditions for releasing the D2D link may be as follows: i) if attach procedure is successfully completed, ii) if PDN connection is activated/established, iii) if tracking update request is accepted.

After the remote UE is connected with the cell, if the PDN connectivity is established with P-GW, P-GW provides the new IP address to the UE. And, the UE registers the updated IP address with application server. Subsequently, the subsequent downlink data destined to the UE is transmitted to the UE via Uu interface between the eNB and UE. And for the uplink data destined to the application server is transmitted to the server via Uu interface between the eNB and UE.

In another example, the UE further starts the timer when a measured cell quality by the remote UE is above the configured/fixed threshold. This is guard time to prevent the interruption of on-going data transmission/reception. During the timer is running, the UE is allowed to use relay connection to communicate with the network. Before the timer is expired, the UE shall disconnect the established connection between the remote UE and the relay. If the UE disconnects the one-to-one connection before the timer is expired, the UE stops the timer. The UE may check whether there is any ongoing downlink data. If there is ongoing downlink data, the UE does not disconnect the connection with the relay. Otherwise, the UE disconnects the connection with the relay. Furthermore, if a measured cell quality by the remote UE is above the configured/fixed threshold and/or the timer is expired, the UE sends to the application server via relay the indication which indicates the application server to stop the data transmission to the relay until the new link is established.

According to another embodiment, the remote UE which is served by the relay when staying out of coverage is going toward cell border satisfying s-criterion (in-coverage). It is assumed that the UE is currently served by relay (RN) which is within the cell and the remote UE does not autonomously disconnect the connection between the relay and the remote UE. In this case, the remote UE may establish RRC connection with the network and sends assistance information to the network during/after RRC connection establishment if one or more conditions is met. At this time, the conditions may be identical to the conditions described in the above embodiment.

As an example, the serving cell of the relay may same as the serving cell of the remote UE. In this case, if the UE is in RRC idle mode, the remote UE establishes the RRC connection when the condition described above is satisfied. When establishing RRC connection, the remote UE reports the L2 identity of the UE itself (e.g. ProSe UE ID), the group information of the UE itself, the traffic information which is served by the relay (PDN identifier, APN information, bearer information, the relay UE identity/group information/PLMN of the connected relay UE, indication whether to disconnect the connection between the relay, indication whether the remote UE is currently served by the relay, serving cell identity and quality of the remote UE and serving cell of the relay UE.

After that, the serving cell of the relay orders the remote UE to de-configure the connection between the relay and the remote UE. Following this order, the remote UE sends the connection disconnect request message over PC5 to the relay UE. And, the relay UE responds to the disconnect request message over PC5 to the remote UE.

As another example, the serving cell of the relay may be different as the serving cell of the remote UE. In this case, if the UE is in RRC idle mode, the remote UE establishes the RRC connection when the condition described above is satisfied. When establishing RRC connection, the remote UE reports the information described above.

After that, if the serving cell of the relay is different from the serving cell of the remote UE, the serving cell of the remote UE requests the disconnection of the connection between remote UE and the relay to the serving cell of the relay UE. The request message includes the L2 relay identity and remote UE identity (e.g. ProSe UE id). In addition, the serving cell of the relay responds to the serving cell of the remote UE. And, the serving cell of the remote UE orders the remote UE to de-configure the connection between the relay and the remote UE. Following this order, the remote UE sends the connection disconnect request message over PC5 to the relay UE. And, the relay UE responds to the disconnect request message over PC5 to the relay UE.

As another example, the serving cell of the relay may be different as the serving cell of the remote UE. In this case, if the UE is in RRC idle mode, the remote UE establishes the RRC connection when the condition described above is satisfied. When establishing RRC connection, the remote UE reports the information described above. If the serving cell of the relay is different from the serving cell of the remote UE, the serving cell of the remote UE requests the disconnection of the connection between remote UE and the relay to the serving cell of the relay UE. The request message includes the L2 relay identity and remote UE identity (e.g. ProSe UE id). In addition, the serving cell of the relay requests the relay to disconnect the connection between the relay and remote UE. The disconnect order includes the remote UE identity. According to the request, the relay UE sends the connection disconnect request message over PC5 to the remote UE. And, the remote UE responds to the disconnect request message over PC5 to the relay UE.

In the embodiments above, the RSRP/RSRQ criteria is required to be satisfied during a certain time in order to avoid the ping-pong. The time value is configured via broadcast/dedicated signaling or fixed. The time value is scaled by the speed of the remote UE. If the speed of the remote UE is high, time value is scaled to the short value. Else if the speed of the remote UE is low, the time value is scaled to long value. In addition, besides the serving cell, the RSRP/RSRQ is measured on a cell in a ProSe carrier or MBMS carrier if the serving carrier is different from the carrier for ProSe and/or MBMS. The configured/fixed threshold is compared with the measured result on the ProSe carrier or MBMS carrier. If cell quality is measured on MBMS carrier, MBSFN RSRP/RSRQ is measured/compared. The sidelink RSRP/RSRQ threshold is also configured for initiating relay discovery for relay reselection. If the measured sidelink RSRP/RSRQ value+hysteresis<the configured RSRP/RSRQ threshold, the UE performs discovery procedure. In other words, the remote UE monitors/receives discovery announcement message and assure whether the received discovery message is from the relay UE or transmits discovery message to find the nearly relay. If the measured sidelink RSRP/RSRQ value−hysteresis>the configured RSRP/RSRQ threshold, the UE does not perform discovery procedure.

FIG. 14 is a block diagram for one example of a communication device according to one embodiment of the present invention.

Referring to FIG. 14, a communication device 1400 includes a processor 1410, a memory 1420, an RF module 1430, a display module 1440 and a user interface module 1450.

The communication device 1400 is illustrated for clarity and convenience of the description and some modules can be omitted. Moreover, the communication device 1400 is able to further include at least one necessary module. And, some modules of the communication device 1400 can be further divided into sub-modules. The processor 1410 is configured to perform operations according to the embodiment of the present invention exemplarily described with reference to the accompanying drawings. In particular, the detailed operations of the processor 1410 can refer to the contents described with reference to FIGS. 1 to 13.

The memory 1420 is connected to the processor 1410 and stores operating systems, applications, program codes, data and the like. The RF module 1430 is connected to the processor 1410 and performs a function of converting a baseband signal to a radio signal or converting a radio signal to a baseband signal. For this, the RF module 1430 performs analog conversion, amplification, filtering and frequency uplink transform or inverse processes thereof. The display module 1440 is connected to the processor 1410 and displays various kinds of information. The display module 1440 can include such a well-known element as LCD (Liquid Crystal Display), LED (Light Emitting Diode), OLED (Organic Light Emitting Diode) and the like, by which the present invention is non-limited. The user interface module 1450 is connected to the processor 1410 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for changing a connection by a user equipment (UE) connected with a relay UE through a device-to-device (D2D) link in a wireless communication system, the method comprising:
receiving information on a threshold value through a broadcast signaling;
measuring a quality of a channel from a cell;
establishing a radio resource control (RRC) connection with the cell and starting a timer, when the measured quality is higher than the threshold value;
transmitting to the relay UE an indication which indicates an application server of the relay UE to stop data transmission; and
releasing the D2D link with the relay UE until the timer expires.

2. The method of claim 1, wherein if data is being received through the D2D link, the D2D link is released after the data reception is completed.

3. The method of claim 1, wherein the D2D link is released when the RRC connection establishment is completed.

4. The method of claim 3, wherein the information on the threshold value comprises validity information,
wherein the validity information includes at least one of time information indicating a time condition in which the threshold value is applied effectively and area information indicating an area condition in which the threshold value is applied effectively, and
wherein the timer is set with a value in the time information.

5. The method of claim 1, wherein the releasing the D2D link comprises: transmitting assistance information on the relay UE to the cell; receiving a message for releasing the D2D link from the cell in response to the assistance information; and releasing the D2D link based on the message.

6. The method of claim 5, wherein the releasing the D2D link further comprises:
transmitting a D2D link release message to the connected relay UE; and
receiving a response message in response to the D2D link release message.

7. The method of claim 1, wherein the threshold value is related to a condition for a PC5 interface.

8. The UE of claim 7, wherein the threshold value is related to a condition for a PC5 interface.

9. A user equipment (UE) connected with a relay UE through a device-to-device (D2D) link in a wireless communication system, the UE comprising:
a transceiver configured to transmit and receive signals; and
a processor configured to process the signals,
wherein the processor is further configured to:
control the transceiver to receive information on a threshold value through a broadcast signaling,
measure a quality of a channel from a cell, establish a radio resource control (RRC) connection with the cell and start a timer, when the measured quality is higher than the threshold value, transmit to the relay UE an indication which indicates an application server to stop data transmission, and release the D2D link with the relay UE until the timer expires.

10. The UE of claim 9, wherein if data is being received through the D2D link, the D2D link is released after the data reception is completed.

11. The UE of claim 9, wherein the processor releasing the D2D link is further configured to release the D2D link when the RRC connection establishment is completed.

12. The UE of claim 11, wherein the information on the threshold value comprises validity information, wherein the validity information includes at least one of time information indicating a time condition in which the threshold value is applied effectively and area information indicating an area condition in which the threshold value is applied effectively, and wherein the timer is set with a value in the time information.

13. The UE of claim 9, wherein the processor is further configured to control the transceiver to transmit assistance information on the relay UE to the cell, control the transceiver to receive a message for releasing the D2D link from the cell in response to the assistance information, and release the D2D link based on the message.

14. The UE of claim 13, wherein the processor is further configured to control the transceiver to transmit a D2D link release message to the connected relay UE, and control the transceiver to receive a response message in response to the D2D link release message.

* * * * *